S. Hartshorn,

Shade Fixture,

No. 2,756, Reissued Aug. 27, 1867.

Witnesses;
N. M. Livingston
C. L. Topliff

Inventor;
Stewart Hartshorn.

UNITED STATES PATENT OFFICE.

STEWART HARTSHORN, OF NEW YORK, N. Y.

IMPROVEMENT IN SHADE-FIXTURES.

Specification forming part of Letters Patent No. 44,624, dated October 11, 1864; reissue No. 2,756, dated August 27, 1867.

*To all whom it may concern:*

Be it known that I, S. HARTSHORN, of the city, county, and State of New York, have invented a new and Improved Shade-Fixture; and I do hereby declare that the following is a full, clear, and exact description thereof, which will enable others skilled in the art to to make and use the same, reference being had to the accompanying drawings, forming a part of this specification, in which—

Figure 1:
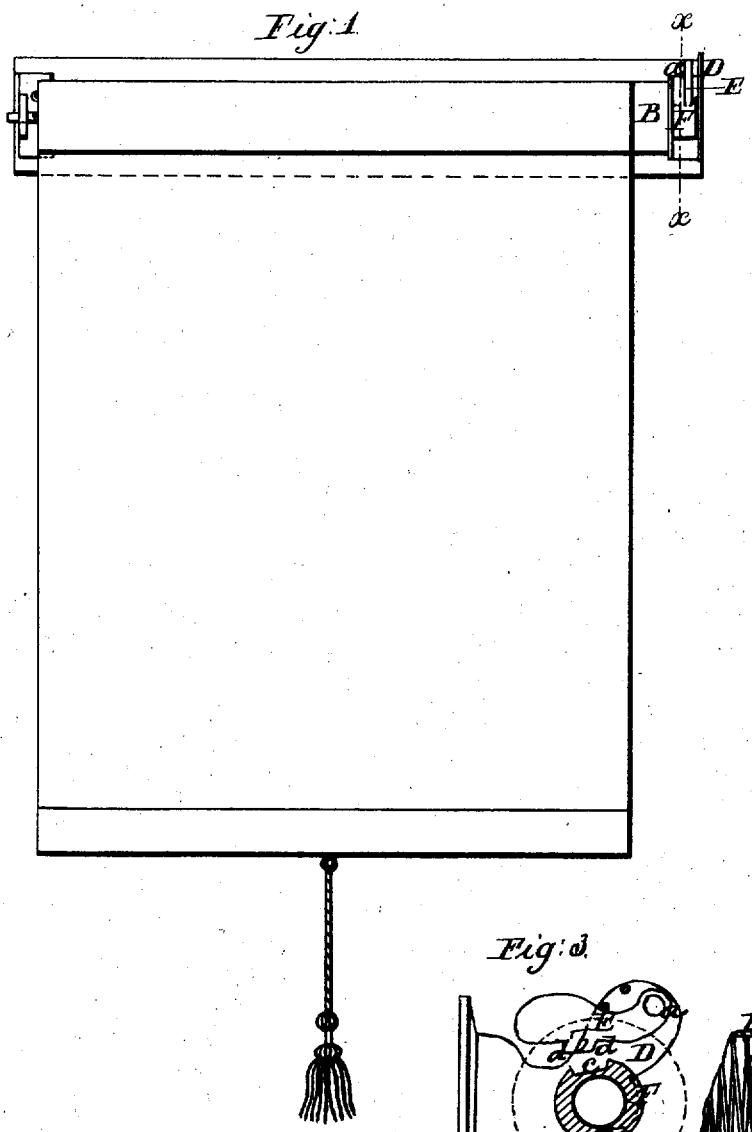
Figure 2:
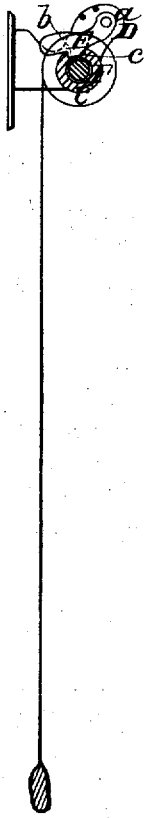
Figure 3:
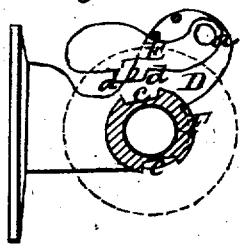
Figure 4:
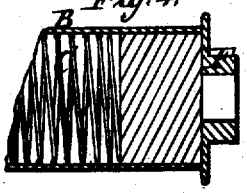
Figure 5:
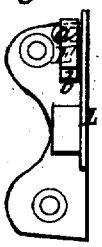

Figure 1 is a front view of my invention applied to a window-shade; Fig. 2, a transverse section of the same taken in the line *x x*, Fig. 1; Fig. 3, an enlarged view of Fig. 2, showing a different position of the pawl; Fig. 4, a longitudinal central section of a portion of the shade-roller; Fig. 5, an enlarged detached front view of the bracket and pawl pertaining to the invention.

Similar letters of reference indicate like parts.

This invention relates to an improvement in that class of shade-fixtures in which the shade-roller is provided with a spiral spring for the purpose of automatically winding up the shade.

The invention consists in the application of a pawl and ratchet or notched hub, arranged in such a manner that the shade may be stopped and retained at any desired height or point within the scope of its movement by a simple manipulation of the shade, as hereinafter fully shown and described, the usual cord for operating or turning the shade-roller being dispensed with entirely, as well as counterpoises, which have in some instances been employed in connection with spring-rollers for holding the shade at any desired point.

A represents a window-shade, and B its roller, the latter having a spiral spring, C, fitted within it, and arranged in such a manner that it will have a tendency to turn the roller B and wind up the shade. The spring C is shown in Fig. 4. This feature, however, of a spring within a shade-roller for the purpose of winding or rolling up the shade is not new. To one of the brackets D, in which the shade-roller B is hung, there is attached by a pivot, *a*, a pawl, E, said pivot passing through one end of the pawl, so that its opposite end will have a tendency to drop, by its own gravity, on a hub, F, attached concentrically to a plate, G, which is secured to one end of the roller B. (See Figs. 2 and 3.) The pawl E is provided with a projection, *b*, which, when the pawl drops, engages with either of two notches, *c c*, in the hub F, and holds the roller B, preventing the shade from being wound upon it. The projection *b* is made rather oblique or inclined at one side, *d*, so as to admit of being forced out of a notch, *c*, when the shade is pulled down. The other side, *d'*, of the projection *b* is made at right angles with the bottom of the pawl, so as to catch firmly against the front edges of the notches, and prevent the spring C from forcing the projection *b* out therefrom, and winding up the shade. By pulling down the shade, however, so that the projection *b* of the pawl will be forced out of the notch *c*, it is fitted in, and then allowing the spring C to turn the roller B briskly back, the projection *b* will slip over the notches, or the latter pass under the former, without catching, and the shade may be wound up to the desired height by the spring, the projection *b* of pawl E catching into a notch as soon as the motion of the roller is checked.

I would remark that, if desired, the pawl E may be placed underneath or at one side of the hub F, instead of over it, as represented, and a spring be made to bear against it in order that its projection *b* may engage with the notches *c c*. I prefer, however, the former method.

Having thus described my invention, I claim as new and desire to secure by Letters Patent—

The application to a shade-roller, provided with a spiral spring for automatically raising or rolling up the shade, of a pawl and a ratchet, or notched hub, so arranged that the former will engage with the latter at any point or height of the shade by simply checking the rotation of the roller and the upward movement of the shade under the influence of the spring, substantially as set forth.

STEWART HARTSHORN.

Witnesses:

ALEX. F. ROBERTS,
J. M. COVINGTON.